Oct. 10, 1961  J. F. NAYLOR  3,003,438
DOUGH SHEETING MACHINE
Filed Jan. 14, 1958  3 Sheets-Sheet 2

Inventor
JOSEPH FRANCIS NAYLOR
By
Mead, Browne, Schuyler & Beveridge
Attorneys

Oct. 10, 1961 J. F. NAYLOR 3,003,438
DOUGH SHEETING MACHINE
Filed Jan. 14, 1958 3 Sheets-Sheet 3

Inventor
JOSEPH FRANCIS NAYLOR
By
Mead, Browne, Schuyler + Beveridge
Attorneys

United States Patent Office 3,003,438
Patented Oct. 10, 1961

3,003,438
DOUGH SHEETING MACHINE
Joseph Francis Naylor, Newton-le-Willows, England, assignor to T. & T. Vicars Limited, Newton-le-Willows, England, a British company
Filed Jan. 14, 1958, Ser. No. 708,819
Claims priority, application Great Britain Jan. 18, 1957
4 Claims. (Cl. 107—12)

The present invention concerns the sheeting of dough.

In the bakery and confectionery industry, numerous machines are known which will accept dough direct from the mixers and produce a homogeneous, uniform and continuous dough sheet for subsequent processing in a variety of ways before baking. Such machines are known as sheeters, and they will deal with a wide range of doughs, but there are some doughs of a short, crumbly nature or which have an elastic consistency, which these known machines do not sheet satisfactorily.

The object of the present invention is to provide a machine which will sheet these latter doughs satisfactorily in addition to being able to treat those doughs which can now be sheeted by known means.

It has previously been proposed to provide, in a dough sheeting machine, a stamping roller which periodically both kneads and acts to control thickness of an intermittently-moving sheet of dough separately extruded from a hopper by two co-operating sheeting rolls. In such a machine there is no direct co-operation between the stamping roller and the sheeting rolls, and the movement of the former is a compound motion composed of a vertically upward-movement while the roller is stationary upon its axis, and of a vertical descent of the roller upon the rough dough sheet while the roller rotates about its axis. Moreover, while the stamping roller is acting upon the dough sheet, the latter is supported on a yielding bed.

The present invention effectively combines the two devices previously arranged separately in a machine and makes it possible to obtain a dough sheet of improved quality, inasmuch as the density and thickness of the sheet energing from the machine can be controlled in addition to the amount of dough being fed into the sheet. Moreover, as previously stated, it enables a much wider range of doughs to be treated than was previously possible with a single machine.

This is achieved by replacing one of the sheeting rolls by a beating roller, causing the axis thereof to continually execute an ovoidal movement and by providing an anvil over which the dough sheet is carried by a conveyor while it is subjected to a pounding motion by the beating roller.

According to the present invention then, a dough sheeting machine comprises a beating roller, arranged to co-operate with a driven feed roller to extrude dough from a hopper, and an anvil, means being provided to produce continuous variation of the spacings between the beating roller and both the feed roller and the anvil. Preferably the axis of the beating roller executes an ovoidal or egg-shaped path.

The beating roller and feed roller are conveniently located beneath the dough hopper and above a travelling web or band upon which dough is extruded and beaten. The anvil, which is conveniently in the form of a roller, can be arranged beneath the travelling web or band in a region below the beating roller.

The feed roller may be provided with a plurality of laterally-extending grooves disposed at spaced intervals around the periphery of the roller, or alternatively it may present a plain surface, dependent upon the type of dough to be sheeted. Moreover, the feed roller, which as stated co-operates with the beating roller, is preferably adjustable in the positioning of its axis. The movement of the beating roller is also conveniently controlled.

The invention will now be described further, by way of example, with reference to the accompanying drawings, in which.

Figure 1:
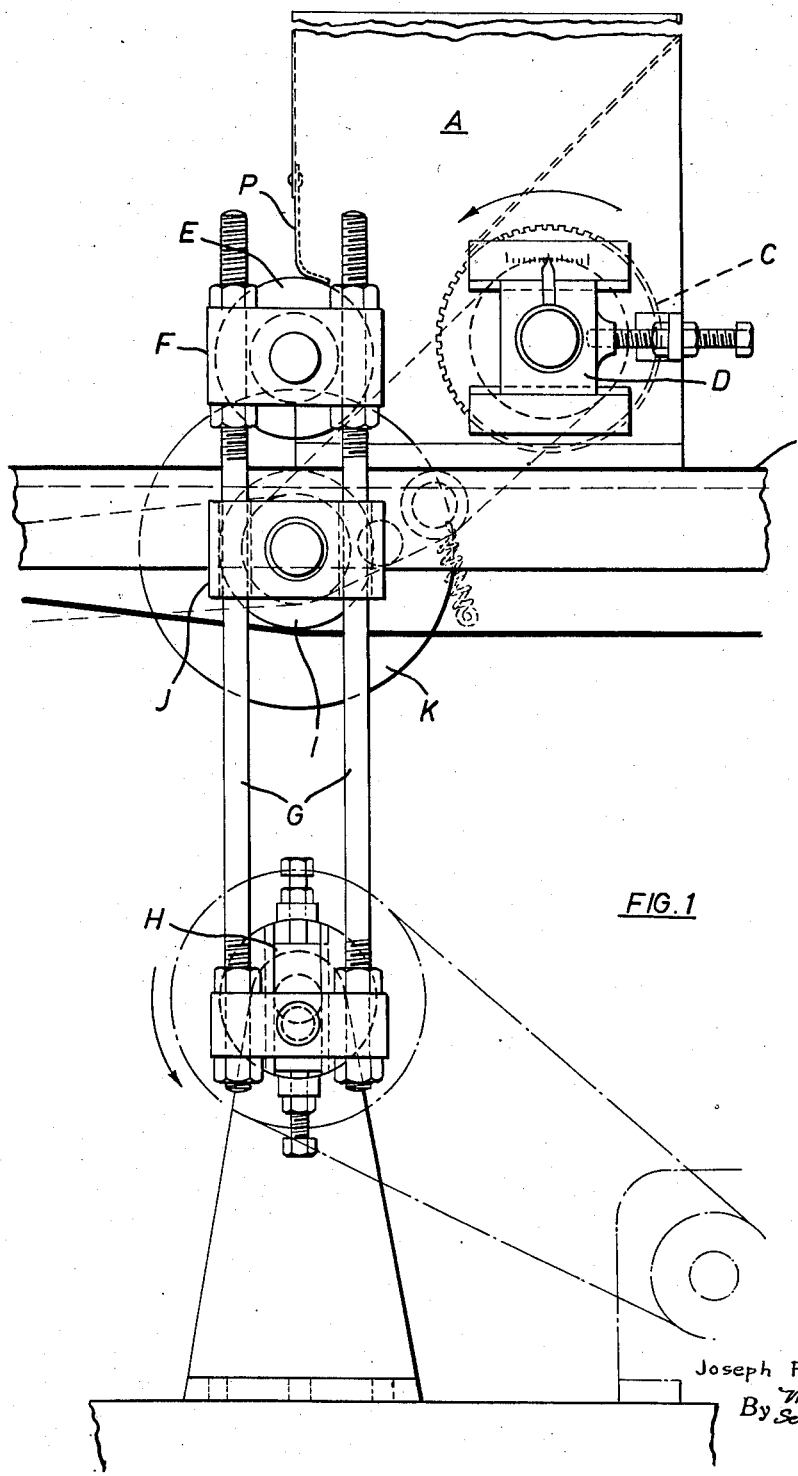
FIG. 1 is a side elevation of a sheeting machine according to the present invention.
Figure 2:
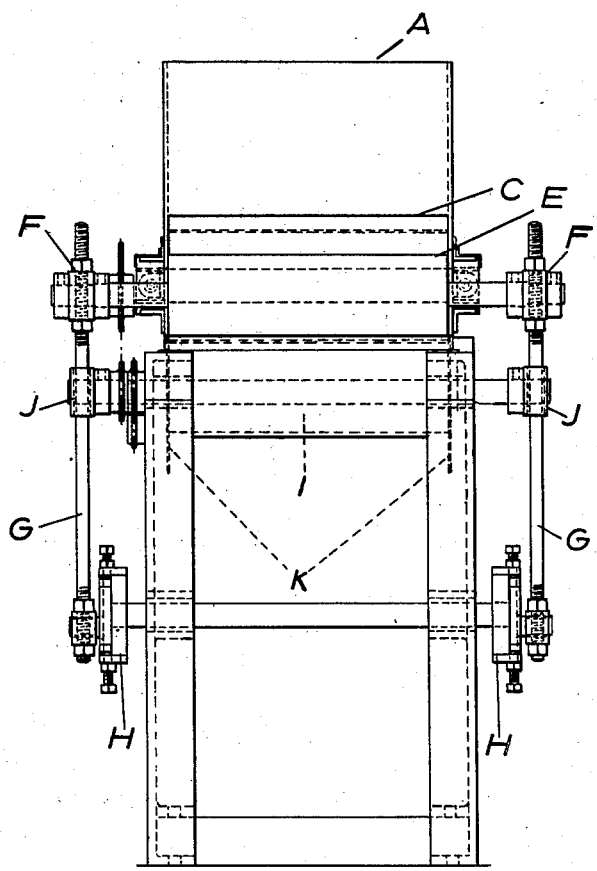
FIG. 2 is a corresponding front elevation to a reduced scale.

The dough sheeting machine comprises a hopper A arranged to receive rough dough direct from the mixing machines and to discharge it through a passage formed between members arranged in the hopper bottom onto a travelling web B. A roller C is located in the lower part of hopper A and is driven in a counterclockwise direction, as viewed in FIG. 1, at a peripheral speed which may be variable relative to the linear speed of travelling web B. This roller may be grooved laterally as shown in the drawings or be plain as determined by the type of dough being handled. Roller C is carried in slide blocks D, which are adjustable to enable the position of roller C, relative to a beating roller E, to be varied. Means to facilitate such adjustment and indicate such positioning are provided on blocks D.

Beating roller E, arranged above web B, is carried in bearings mounted in housings F. Housings F in turn are carried in an adjustable manner on the upper ends of rods G, which are provided with threads and cooperating nuts for that purpose, so that the setting of beating roller E above travelling web B can be adjusted. The lower ends of rods G are connected to an adjustable crank or eccentric, generally designated H, which is positively driven in the same direction as roller C.

Beneath travelling web B and below beating roller E, an anvil is provided. In the illustrated example this is formed by roller I having end flanges K protruding above the web B and constituting side walls therefor at that point.

The bearings for anvil roller I are surrounded by another set of bearings which carry blocks J having bores through which rods G pass, whereby the latter are guided in their movement imparted by the driven crank or eccentric H.

Dough, fed into hopper A is extruded between rotating roller C and beating roller E onto the travelling web B in sheet form, whereupon it is subjected to a further pounding action between beating roller E and anvil roller I as it passes therebetween. The dough sheet so produced is carried by web B onwardly for further treatment. Variation of the spacing between roller C and beating roller E controls the amount of dough fed into the sheet, while the action of beating roller E co-operating with anvil roller I influences the density and thickness of the sheet emerging from between rollers E and I.

Figure 3:
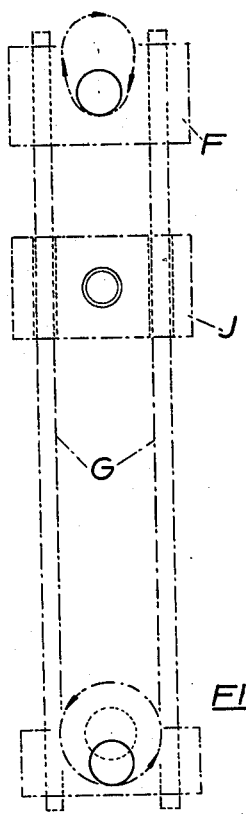
FIG. 3 is a diagram showing the orbital path described by the axis of the beating roller during operation of the machine, and FIG. 4 a detail of the front lower section of the dough hopper showing a preferred seal between the hopper and the beating roller.

FIG. 3 of the drawings shows the ovoidal or egg-shaped path which is described by the housings F, and hence beating roller E during operation of the machine.

This particular-shaped path is traced out by housings F due to the fixed connection formed by rods G extending between the rotating crank or eccentric H and the housings, and the fact that rods G are constrained by virtue of the fact that they slide through bores in rockable blocks J.

Figure 4:
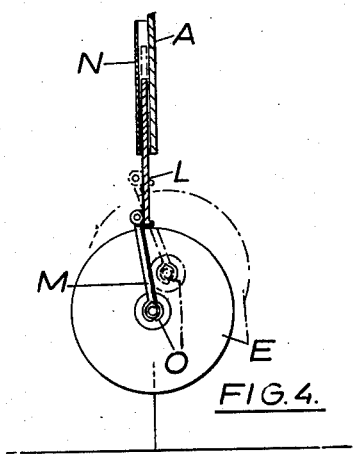

The lower front edge of the hopper A may be sealed with respect to the moving beating roller E by means of a canvas flap P as can be seen in FIG. 1 of the drawings, so that there is no tendency for the material within the hopper to leak out through the space between the two members. It is preferred, however, to effect a more positive seal at this point by providing a flap L on the front wall of the hopper A, which flap is held against the front wall by, but is displaceable vertically within, angled side guides N (FIG. 4). Flap L is supported by rods M pivotally connected thereto at each side thereof, the other end of each rod M being carried by a ring O carried loosely on the shaft of roller E at each side thereof. As the roller E travels around its ovidal or egg-shaped path, the flap L moves up and down within guides N so that the lower edge of the flap remains at all times in close proximity to the peripheral surface of roller E. This arrangement, coupled with the fact that any rotation of roller E will be in such a direction as to lead material into rather than out of the hopper at this point, ensures a good seal between flap L and roller E.

By suitable adjustment of the position of roller C and of the movement of beating roller E and the associated action between the beating roller E and the anvil surface, a perfectly smooth dough sheet of the required texture and thickness can be obtained.

I claim:

1. A dough sheeting machine for doughs having a wide range of consistencies comprising a dough hopper, a beating roller and a driven feed roller laterally arranged beneath said hopper and defining a hopper outlet for the dough between the longitudinally extending surfaces of said rollers, a traveling belt disposed beneath said rollers and said outlet to receive the extruded dough from said outlet, an anvil disposed directly below said belt and said beating roller, and means on said beating roller for continuously varying the lateral distance of said roller surface relative to the surface of said driven roller to effect a continuous variance in the size of said outlet during the operation of the machine, said means simultaneously varying the vertical distance of said beating roller relative to said anvil disposed beneath said beating roller.

2. A dough sheeting machine as defined in claim 1 including driving means linked to said means on said beating roller and axially moving said beating roller in an ovoidal path to simultaneously and continuously vary the spacing of said beating roller surface to said driven feed roller and to said anvil.

3. A dough sheeting machine as defined in claim 1 wherein said driven feed roller is laterally-grooved.

4. A dough sheeting machine as defined in claim 1 including an automatically adjustable seal disposed between said beating roller surface and a wall of said hopper, one longitudinal edge of said seal extending substantially along the length of and in contact with said beating roller surface, the ends of said seal pivotally linked to the shaft of said beating roller, said seal moving vertically relative to said hopper wall as said beating roller moves relative to said anvil and said driven feed roller.

References Cited in the file of this patent

UNITED STATES PATENTS

| | | |
|---|---|---|
| 777,349 | Mitchell | Dec. 13, 1904 |
| 841,408 | Kruse | Jan. 15, 1907 |
| 1,782,006 | Kremmling | Nov. 18, 1930 |
| 2,323,907 | Harriss et al. | July 13, 1943 |
| 2,526,944 | Grainger | Oct. 24, 1950 |